United States Patent
Stevens

(10) Patent No.: US 7,496,493 B1
(45) Date of Patent: Feb. 24, 2009

(54) EXTERNAL MEMORY DEVICE TO PROVIDE DISK DEVICE AND OPTICAL FUNCTIONALITY

(75) Inventor: Curtis E. Stevens, Irvine, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 512 days.

(21) Appl. No.: 10/984,289

(22) Filed: Nov. 9, 2004

(51) Int. Cl.
*G06F 9/455* (2006.01)

(52) U.S. Cl. .......................................... 703/24; 711/100
(58) Field of Classification Search .................. 703/24; 711/100
See application file for complete search history.

(56) References Cited

U.S. PATENT DOCUMENTS

| | | | |
|---|---|---|---|
| 5,404,485 A * | 4/1995 | Ban ............................ | 711/202 |
| 5,526,328 A | 6/1996 | Oshima et al. | |
| 5,581,740 A | 12/1996 | Jones | |
| 5,937,423 A * | 8/1999 | Robinson ...................... | 711/103 |
| 6,148,354 A * | 11/2000 | Ban et al. ..................... | 710/301 |
| 6,385,667 B1 * | 5/2002 | Estakhri et al. ................. | 710/8 |
| 6,574,588 B1 * | 6/2003 | Shapiro et al. ................. | 703/24 |
| 6,609,173 B1 * | 8/2003 | Watkins ....................... | 711/103 |
| 6,654,816 B1 * | 11/2003 | Zaudtke et al. ................. | 710/1 |
| 6,715,043 B1 | 3/2004 | Stevens | |
| 6,832,186 B1 * | 12/2004 | Margulieux ................... | 703/24 |
| 6,968,307 B1 * | 11/2005 | Chrysanthakopoulos ..... | 703/27 |
| 7,039,759 B2 * | 5/2006 | Cheng et al. .................. | 711/115 |
| 7,171,502 B2 * | 1/2007 | Jeon et al. ..................... | 710/300 |
| 2002/0078367 A1 * | 6/2002 | Lang et al. .................... | 713/200 |
| 2003/0142554 A1 * | 7/2003 | Green et al. ............ | 365/189.01 |
| 2003/0200379 A1 * | 10/2003 | Hollingsworth et al. ...... | 711/103 |
| 2004/0075932 A1 | 4/2004 | Watson | |
| 2004/0215471 A1 * | 10/2004 | Tamagno et al. ................ | 705/1 |
| 2005/0049848 A1 * | 3/2005 | Dai .............................. | 703/24 |
| 2005/0050471 A1 * | 3/2005 | Hallisey et al. .............. | 715/734 |

FOREIGN PATENT DOCUMENTS

WO WO 03/015093 A1 2/2003

OTHER PUBLICATIONS

ISSCC Roundtable; "Embedded memories for the Future", Aug. 2003, IEEE Design & Test of Computers, vol. 20, No. 4, pp. 66-81.*
David Thompson, "IEEE 1394: Changing the Way We Do Multimedia Communications", Jun. 2000, IEEE Multimedia, vol. 7, Issue 2, pp. 94-100.*
Andy Rathbone, "Windows XP for Dummies", 2001, Wiley Publishing, p. 153.*

* cited by examiner

*Primary Examiner*—Paul L Rodriguez
*Assistant Examiner*—Russ Guill
(74) *Attorney, Agent, or Firm*—Blakely, Sokoloff, Taylor & Zafman

(57) ABSTRACT

A memory device is attachable to a host computer system. The memory device includes an interface to couple the memory device to the host computer system. The memory device includes a controller for controlling operations in the memory device. The controller enables a first mode of operation in which the memory device communicates with the host computer system through the interface by emulating a disk device and a second mode of operation in which the memory device communicates through the interface by emulating an optical device.

24 Claims, 6 Drawing Sheets

EXTERNAL MEMORY DEVICE TO PROVIDE DISK DEVICE AND OPTICAL FUNCTIONALITY

BACKGROUND OF THE INVENTION

1. Field of the Invention

The present invention relates to external memory devices. More particularly, the present invention relates to an external memory device that provides disk device and optical device functionality.

2. Description of the Prior Art and Related Information

Today, computers are routinely used both at work and in the home. Further, with the advent of lap-tops and personal digital assistants, computers are being used while traveling and during many typical daily and nightly activities. Today, people use computers all the time.

Computers advantageously enable file sharing, the creation of electronic documents, the use of application specific hardware, the ability to play games, music and videos, and enable electronic commerce through the Internet and other computer networks. Most computing systems have a plurality of internal storage devices to aid in accomplishing these functions.

For example, with reference to FIG. 1, an example of a typical present day computer environment 100 with a host computer system 102 having a processor 104 (e.g. a central processing unit (CPU)) is shown. A typical host computer system 102 has a plurality of internal storage peripherals such as a hard disk drive (HDD) 103, a compact disk (CD) drive and/or digital video disk (DVD) drive 106, as well as a floppy drive 107. Also, typical host computer systems include a plurality of input/output (I/O) devices 106 such as display monitors, keyboards, speakers, etc.

Further, it has become increasingly common to utilize external disk drives that are easily removable from the host computer system 102 such that data can be readily transferred from one computer to another. For example, it is useful to have an external disk drive that can be used at work where work related projects are stored and that can then be easily removed and taken home. In this way, the removable external disk drive can then be plugged into a home computer so that an employee can work on work-related projects at home.

Many of these external disk drives utilize today's very prevalent Universal Serial Bus (USB) interface 110 to interface with external storage peripherals such as external disk drives. In fact, as shown in FIG. 1, often times a USB hub 130 is utilized to provide access to a plurality of storage peripherals. For example, in a common computer environment 100, a host computer system 102 may connect through a USB interface 110 to an external hard disk drive 120 being powered by an external power supply 122, and through a USB hub 130, may be connected to a plurality of other disk drives such as DVD disk drive 134, CD drive 138, and zip drive 142. All of these drives have their own respective external power supplies 136, 140, and 144, respectively.

Unfortunately, most external disk drives require external power sources such as power from a wall socket. This seriously inhibits mobility and the usefulness of the external drive. Further, battery-powered external disk drives have a very limited life-time before they need re-charging. Particularly, present day external CD drives, DVD drives, and larger HDDs typically require too much power to be powered by the host computer itself.

However, recently small mobile HDDs, often termed "thumb drives", have been created that require far less power to operate and can be fully powered by a USB interface of the host computer system itself. Also, it should be noted that other types of memory devices, such as compact flash memory, can also now be fully powered by a USB interface. Unfortunately, optical disk drives, such as CD drives and DVD drives require a considerable amount of power to spin, read, and write to the optical media and, thus, cannot now (or most likely in the near future) be powered through an interface by a host computer system itself and require external power supplies.

SUMMARY OF THE INVENTION

The present invention relates to an external memory device that does not require an external power supply and that provides disk device and optical device functionality.

In one aspect, the invention may be regarded as a memory device that is attachable to a host computer system. The memory device includes an interface to couple the memory device to the host computer system and a controller for controlling operations in the memory device. The controller enables a first mode of operation in which the memory device communicates with the host computer system through the interface by emulating a disk device and a second mode of operation in which the memory device communicates with the host computer system through the interface by emulating an optical device.

In one embodiment, upon connection of the memory device to the host computer system, the controller communicates the first and second modes of operation to the host computer system such that the host computer system upon a display device displays icons associated with a disk device and an optical device for selection by a user. The optical device to be emulated may be one of a compact disk (CD) drive and a digital video (DVD) drive and the disk device to be emulated may be a hard drive. The memory device may be fully powered through the interface by the host computer system.

In one embodiment, a translator may be operable with the controller to translate optical device data and disk device data received from the host computer system into a memory format for storage in a memory and to translate data requested by the host computer system from the memory into one of an optical device format or a disk device format. Particularly, the interface may be a Universal Serial Bus (USB) interface and the memory device may be fully powered through the USB interface by the host computer system. In the first mode of operation, the memory device may communicate with the host computer through first and second USB input and output pipes, respectively, in a disk device protocol, and in the second mode of operation, the memory device may communicate with the host computer system through third and fourth USB input and output pipes, respectively, in an optical device protocol. In one embodiment, the USB interface may utilize a single cable.

In one embodiment, the memory device may be a flash memory device or a random access memory (RAM) device that includes a RAM memory. For example, the RAM memory of the RAM device may be one of a static RAM (SRAM) and a pseudo-static RAM. Alternatively, the RAM memory of the RAM device may be one of a dynamic RAM (DRAM) and a magneto-resistive RAM (MRAM). Further, in one embodiment, the interface may be compatible with a IEEE 1394 standard and the memory device may be fully powered through the interface by the host computer system.

In another aspect, the invention may be regarded as an external disk drive attachable to a host computer system, in which the external disk drive includes an interface to couple the external disk drive to the host computer system and a microprocessor for controlling operations in the external disk drive. The microprocessor under the control of a program may enable a first mode of operation in which the external disk drive communicates with the host computer system through the interface by emulating an optical device and a second mode of operation in which the external disk drive communicates with the host computer system as an optical disk drive to emulate an optical disk drive.

In one embodiment, upon connection of the external disk drive to the host computer system, the microprocessor communicates the first and second modes of operation to the host computer system such that the host computer system upon a display device displays icons associated with the disk device and the optical device for selection by a user. The optical device to be emulated may be one of a CD drive and a DVD drive and the disk device to be emulated may be a hard disk drive. The external disk drive may be fully powered through the interface by the host computer system.

In one embodiment, a translator operable with the microprocessor may translate optical device data received from the host computer system into a disk device format for storage onto the disk and may translate data received from a disk in a disk device format into an optical device format for transmission to the host computer system. The interface may be a USB interface and the external disk drive may be fully powered through the interface by the host computer system. In the first mode of operation, the external disk drive communicates with the host computer system through first and second USB input and output pipes, respectively, in a disk device protocol, and in the second mode of operation, the disk drive communicates with the host computer system through third and fourth USB input and output pipes, respectively, in an optical device protocol. In one embodiment, the USB interface may utilize a single cable.

In further embodiments, a third mode of operation is provided in which the external disk drive communicates with the host computer system as a floppy disk drive to emulate a floppy disk drive. Also, a third mode of operation may be provided in which the external disk drive communicates with the host computer system as a zip disk drive to emulate a zip disk drive. Additionally, a third mode of operation may be provided in which the external disk drive communicates with the host computer system as a magneto-optical disk drive to emulate a magneto-optical disk drive. Moreover, in one embodiment, the interface may be a compatible with a IEEE 1394 standard and the external disk drive may be fully powered through the interface by the host computer system.

DETAILED DESCRIPTION

Aspects of the invention relate to small external memory devices that do not require an external power supply and that provide disk device functionality and optical device functionality, along with other media functionality types.

Figure 1:
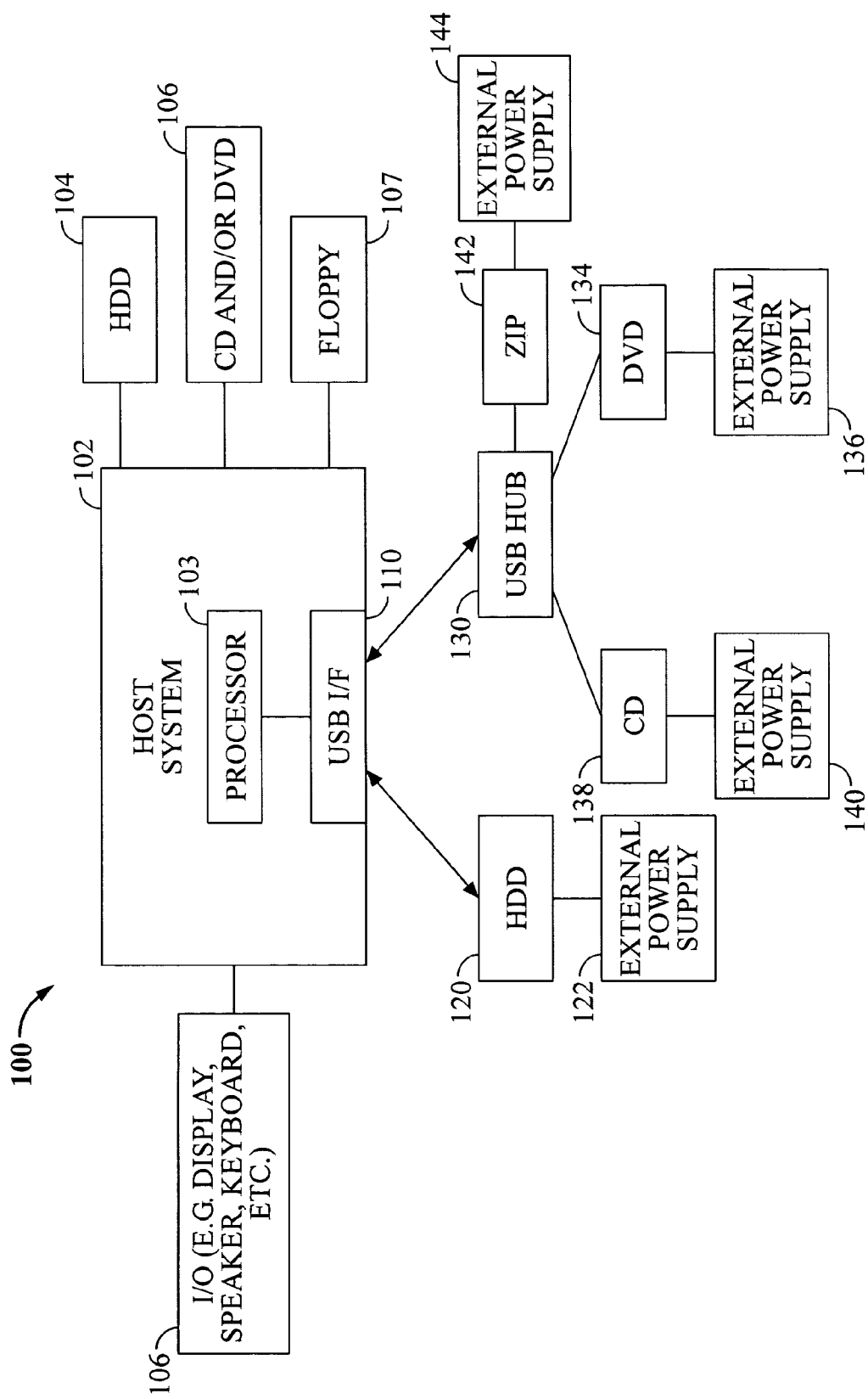
FIG. 1 is a block diagram illustrating an example of a typical present day host computer system having attached external devices requiring external power supplies.
Figure 2:
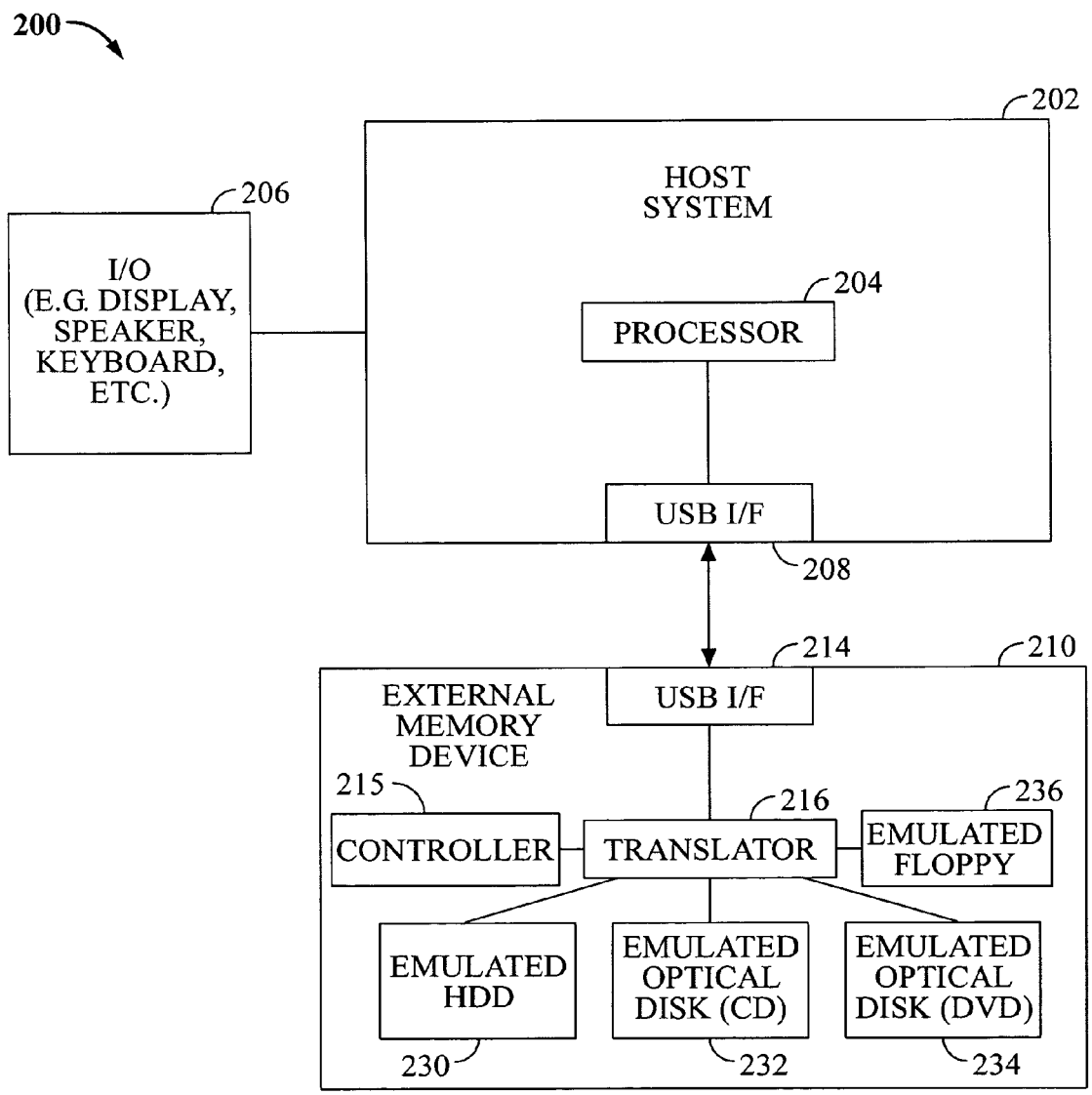
FIG. 2 is a block diagram illustrating an external memory device coupled to a host computer system, according to one embodiment of the invention.

With reference to FIG. 2, FIG. 2 is a block diagram 200 illustrating one embodiment of the invention of an external memory device 210 coupled to a host computer system 202.

As discussed herein, a host computer system 202 is a product including circuitry capable of processing data. The host computer system 202 may include, but is not limited to, general purpose computer systems (e.g. server, laptop, desktop, palm pilot, personal electronic devices etc.), personal computers (PCs), hard copy equipment (e.g. printer, plotter, fax machine, etc.), and the like. Further, a host computer system 202 typically includes a processor 204, such as a central processing unit (CPU) or a microprocessor, in order to process data and implement applications, programs, modules, etc. Moreover, as should be appreciated, host computer systems typically include input/output (I/O) devices 206 such as display devices, speakers, keyboards, etc.

Further, in one embodiment, the external memory device 210 may be coupled by a universal serial bus (USB) interface 214 to the host computer system 202 similarly having a USB interface 208 for interconnection. Thus, utilizing a USB interface 214 external memory device 210 may be coupled to host computer system 202. Although a USB interface will be described in connecting the external memory device 210 to the host computer system 202 and for implementation purposes, it should be appreciated that other types of interfaces such as IEEE 1394 standard interfaces (e.g. 1394, 1394.1, 1394.a, 1394.b, FIREWIRE, etc.) and serial advanced technology attachment (SATA) types of interfaces may also be utilized.

The external memory device 210 includes USB interface 214 coupled to a translator 216. Further, a controller 215 is coupled to translator 216. The external memory device 210 includes memory to store data including data to emulate a disk device, such as a hard disk drive (HDD), shown as emulated HDD 230 and an optical device. The types of optical devices that may be emulated include an emulated compact disk (CD) drive 232 and an emulated digital video (DVD) drive 234. Other types of storage devices such as an emulated floppy 236 may also be emulated.

It should be appreciated that the storage device to be emulated may be any memory-based storage device including but not limited to a CD drive, a DVD drive, a tape drive, a floppy disk drive, a zip drive, a jazz drive, a high density floppy drive, document scanner, printer, solid state memory device, high capacity removable media device, low capacity removable media device, combination high and low capacity removable media device, a hard disk drive, a magneto-optical disk drive, etc. However, for present discussion purposes, media emulation techniques will be discussed with reference to only emulated hard disk drives (HDDs) and emulated optical disk drives. It is understood that these are only exemplary and that the media emulation techniques may be implemented using other storage media.

Also, for the purposes of the present description, the term "controller", "processor" or "CPU" refers to any machine that is capable of executing a sequence of instructions and should be taken to include, but not be limited to, general purpose microprocessors, special purpose microprocessors, application specific integrated circuits (ASICs), multi-media controllers, signal processors, electronic gates, micro-controllers, etc.

In one embodiment, the external memory device 210 itself may be a compact flash memory device. However, in other embodiments, the external memory device may be a random access memory (RAM) device. In this embodiment, the RAM memory of the RAM device may be a static RAM (SRAM), a pseudo-static RAM, a dynamic RAM (DRAM), or a magneto-resistive RAM (MRAM). However, it should be appreciated that a wide variety of different types of memory may be utilized with external memory device 210 and that these descriptions are only exemplary.

One of the advantages of external memory device 210 having USB interface 214 is that external memory device 210 is fully powered through the USB interface 214 by the host computer system 202. Likewise, in the IEEE 1394 interface embodiment, the external memory device 210 may also be powered through the interface by the host computer system 202. In one embodiment, the USB interface or the IEEE 1394 interface may utilize a single cable.

Looking particularly at the external memory device 210, external memory device 210 includes a controller 215 for controlling operations in the external memory device 210 including emulating a hard disk drive and an optical disk drive by enabling at least two different modes of operation. In the first mode of operation, the external memory device 210 communicates with the host computer system 202 through the USB interface 214 as an emulated hard disk drive (HDD) 230. In a second mode of operation, the external memory device 210 communicates with the host computer system as an optical disk drive such as an emulated CD drive 232 or an emulated DVD drive 234.

Particularly, as will be discussed, upon connection of the external memory device 210 to the host computer system 202, the controller 215 communicates the first and second modes of operation to the host computer system 202 such that the host computer system 202 upon a display device will display icons associated with a hard disk drive and a CD ROM drive and a DVD drive for selection by the user. This will be discussed in more detail later.

A translator 216 operable with controller 215 may be utilized to translate optical disk data (e.g. CD and DVD data) and hard disk drive (HDD) data received from the host computer system 202 into a memory format associated with the external memory device for storage in the memory of the external memory device (e.g. compact flash) for storage as emulated HDD 230, emulated CD drive 232, and emulated DVD drive 234. Similarly, but in reverse, translator 216 operable with controller 215 also performs the reverse operation in which based on requested HDD, CD, DVD information from the host computer system 202, the translator 216 retrieves data stored as emulated HDD 230, emulated CD drive 232, and emulated DVD drive 234 stored in a memory format associated with the external memory device 210 (e.g. compact flash) and translates it back into the appropriate data format for use by the host computer system, particularly, back into hard disk drive (HDD) format, CD drive format, and DVD drive format, respectively.

It should be appreciated that translator 216 may be implemented in hardware, software, firmware, middleware, or a combination thereof and utilized in conjunction with controller 215. When implemented in software or firmware, the elements of the translator are the instruction/code segments to perform the necessary tasks.

Figure 3:
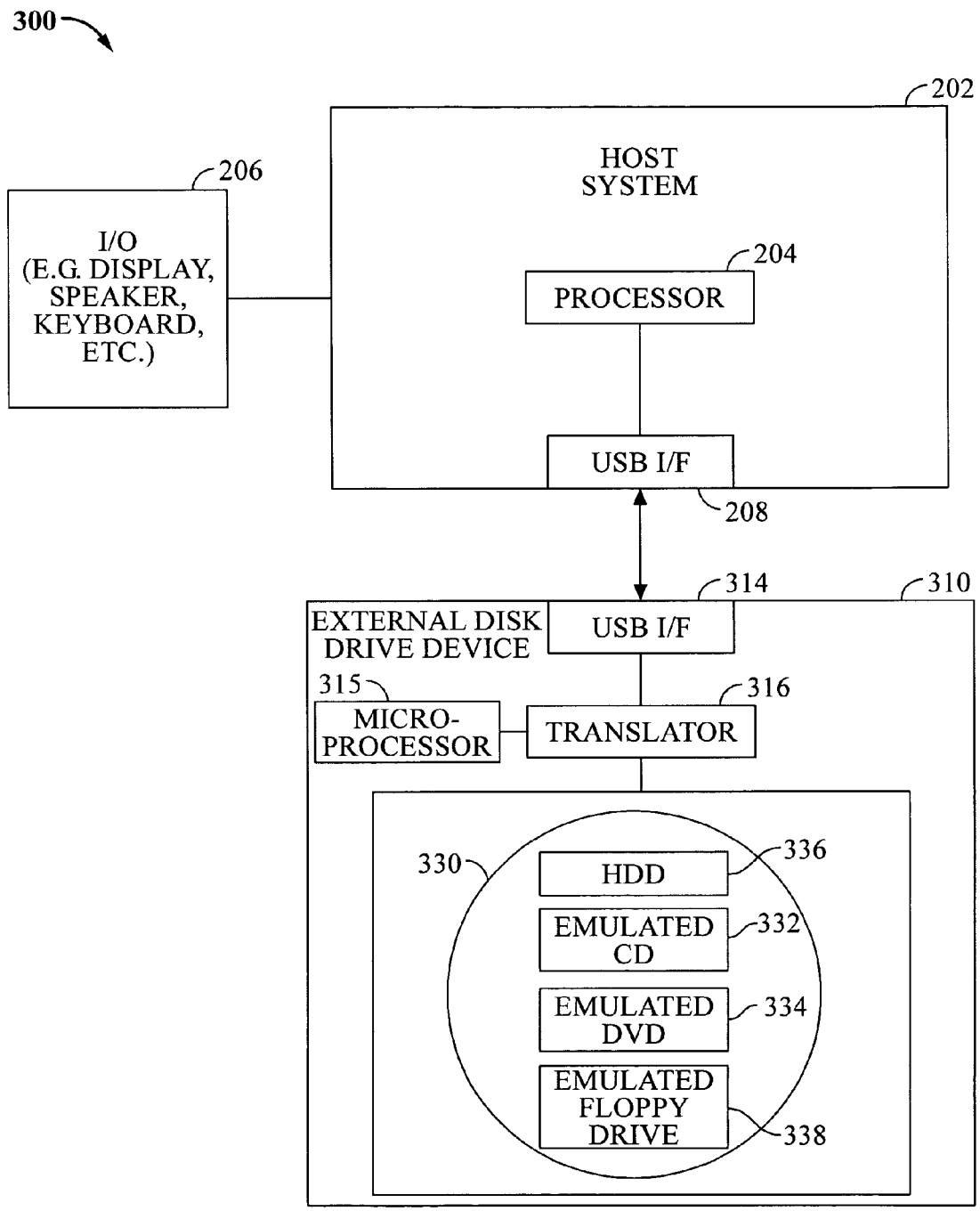
FIG. 3 is a block diagram illustrating an external disk drive device coupled to a host computer system, according to one embodiment of the invention.

With reference to FIG. 3, FIG. 3 is a block diagram 300 of an embodiment of the invention wherein the external memory device that is attachable to the host computer system 202 is an external disk drive device 310. Particularly, the external disk drive device 310 may be a small mobile hard disk drive (HDD) device having a USB interface 314 that does not require an external power supply. Particularly, the external disk drive device 210 includes a disk 330 to store data as disk device data (e.g. hard disk drive data 336) and data to emulate optical devices including optical disk drives such as an emulated CD drive 332 and an emulated DVD drive 334. Further, the external disk drive 210 includes a USB interface 314 to connect to the USB interface 208 of the host computer system 202.

The external hard disk drive device 310 also includes a microprocessor 315 for controlling operations in the external disk drive 310 including emulating optical devices such as optical disk drives shown as emulated CD drive 332 and emulated DVD drive 334. Particularly, the microprocessor 315 under the control of a program enables a first mode of operation in which the external disk drive 310 communicates with the host computer system 202 through the USB interface 314 as a disk device (e.g. a hard disk drive (HDD)) and a second mode of operation in which the external disk drive 310 communicates with the host computer system 202 as an optical device such as an optical disk drive in order to emulate an optical disk drive, such as emulated CD drive 332 and emulated DVD drive 334.

Particularly, in one embodiment the external hard disk drive device 310 is fully powered through the USB interface 314 by the host computer system 202. However, it should be appreciated that instead of a USB interface, a IEEE 1394 interface or a serial advanced technology attachment (SATA) interface may be utilized instead. Similarly, in these cases, the external disk drive device 310 is interfaced to the host computer system 202 and is fully powered through the interface by the host computer system 202. In one embodiment, the USB interface or the IEEE 1394 interface may utilize a single cable.

When the external hard disk drive device 310 is attached to the host computer system 202, the microprocessor 315 may communicate the first and second modes of operation to the host computer system 202 such that the host computer system 202 upon the display device 206, displays icons associated with the hard disk drive (HDD) 336, the emulated CD drive 332, and the emulated DVD drive 334 for selection by a user. This will be discussed in more detail later. Also, it should be appreciated that the external disk drive device may also include other modes of operation in which the external disk drive device 310 communicates with the host computer system as an emulated floppy disk drive 338, an emulated zip disk drive, an emulated magneto-optical disk drive, etc.

It should be appreciated that the storage device to be emulated may be any memory-based storage device including but not limited to a CD drive, a DVD drive, a tape drive, a floppy disk drive, a zip drive, a jazz drive, a high density floppy drive, document scanner, printer, solid state memory device, high capacity removable media device, low capacity removable media device, combination high and low capacity removable media device, a HDD, a magneto-optical disk drive, etc. However, for present discussion purposes, media emulation techniques will be discussed with reference to only emulated hard disk drives and emulated optical disk drives. It is understood that these are only exemplary and that the media emulation techniques may be implemented using other storage media.

Also, for the purposes of the present description, the term "microprocessor", "processor" or "CPU" refers to any machine that is capable of executing a sequence of instructions and should be taken to include, but not be limited to, controllers, general purpose microprocessors, special purpose microprocessors, application specific integrated circuits (ASICs), multi-media controllers, signal processors, electronic gates, and micro-controllers, etc.

In one embodiment, the external hard disk drive 310 includes a translator 316 operable with the microprocessor 315. The translator 316 translates optical disk data (e.g. CD and DVD data) received from the host computer system 202 into a hard disk drive format for storage onto the disk 330 as shown as HDD 336, emulated CD drive 332, and emulated DVD drive 334. Further, the translator 316 in reverse, translates data requested by the host computer system 202 and retrieved from the disk 330 in a hard disk drive format back into an optical disk format (e.g. a CD format or DVD format) for transmission back to a requesting application of the host computer system 202. This will be discussed in more detail later.

It should be appreciated that the translator 316 may be implemented in hardware, software, firmware, middleware, or a combination thereof and may be implemented with the microprocessor 315. When implemented in software or firmware, the elements of the translator are the instruction/code segments to perform the necessary tasks.

Figure 4:
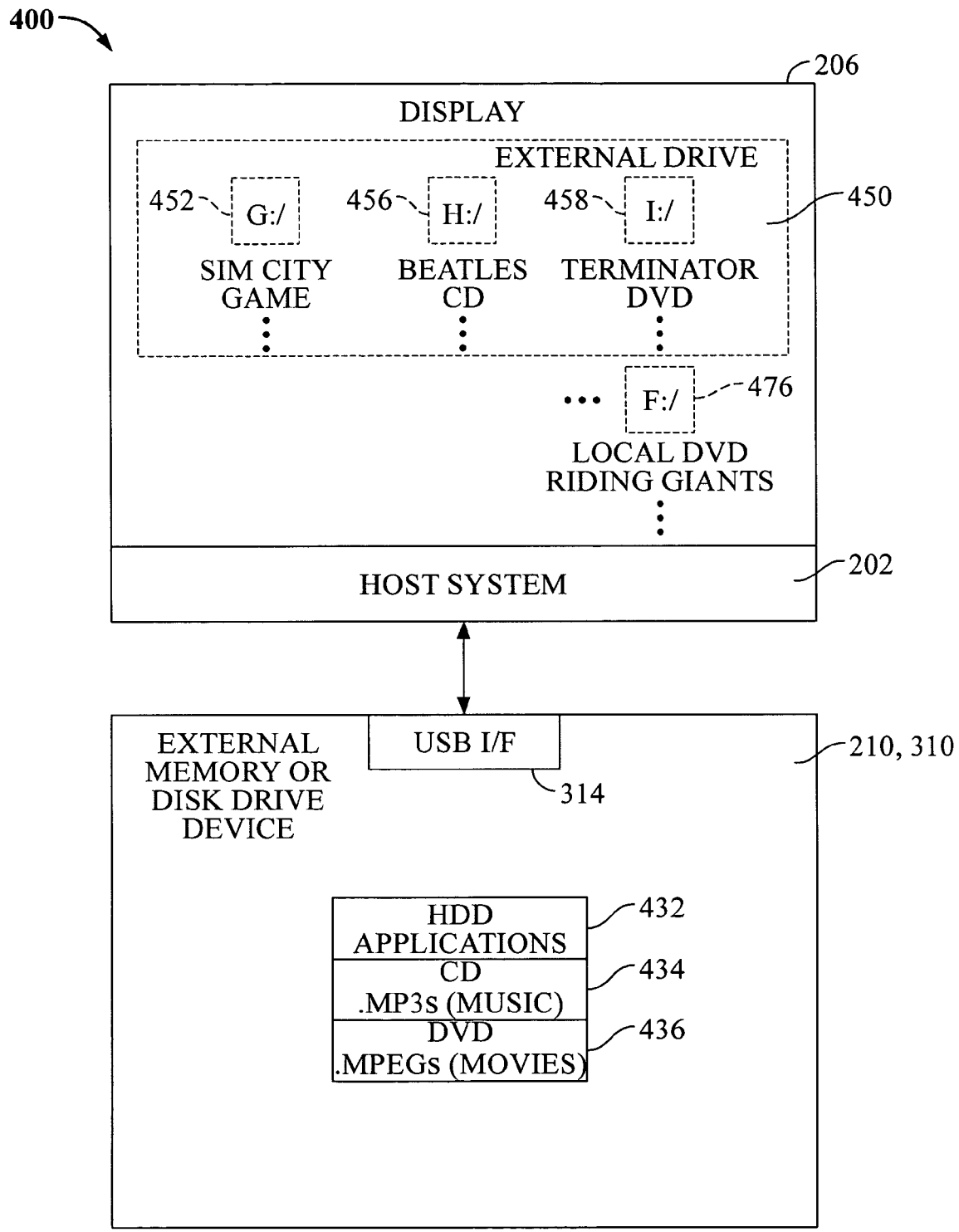
FIG. 4 is a block diagram illustrating the display of a host computer system when an external memory device is attached to the host computer system, according to one embodiment of the invention.

Turning now to FIG. 4, FIG. 4 is a block diagram 400 illustrating the display device 206 of a host computer system 202 when an external memory device 210 or external disk drive device 310 is attached to the host computer system. Particularly, when the external memory device 210 or external disk drive device 310 is coupled via the USB interface 314 to the host system 202, the external memory device or external disk device (hereinafter referred to as external device) communicates the first and second modes of operation to the host computer system 202 such that the host computer system upon display device 206 displays icons 450 associated with a hard disk drive, and optical disk drives (e.g. CD drives and DVD drives), for selection by a user.

As previously discussed, the external devices 210, 310 store HDD data 432 such as software applications as an emulated HDD, CD data 434 such as music files (e.g. MP3s) as an emulated CD drive, and DVD data 436 such as movies (e.g. in MPEG format) as an emulated DVD drive. It should be appreciated that these are only examples and that a wide variety of types of HDD data, CD data, and DVD data may be stored for a wide array of different types of applications, games, multimedia files, music files, movie files, etc., in a wide range of different formats, the illustrated examples only being exemplary.

As shown in FIG. 4, upon connection of the external device 210, 310 to the host computer system 202, the first and second modes of operation are communicated to the host computer system such that the host computer system upon the display device 206, displays icons 450 associated with a disk device (e.g. hard disk drive), and optical devices including optical disk drives such as a CD disk drive, and a DVD disk drive for selection by a user. FIG. 4 shows an example of this.

As shown in FIG. 4, when the external device 210, 310 is connected to the host computer system 202, an HDD icon may be displayed. In this example, HDD icon 452 represented by G:/ shows an application for selection, such as a SIM CITY game, that is displayed to indicate to the user that the external device is storing this HDD file for selection by a user. Further, display device 206 may display a CD drive icon 456 shown as H:/ with a title of BEATLES CD to indicate to the user that the external device is storing an emulated CD data music file such that a user can select this CD data file and have the selected BEATLES CD music played back to the user. Further, continuing with the present example, the display device 206 also illustrates a DVD icon 458 shown as I:/ TERMINATOR DVD to indicate to the user that the external device has stored an emulated DVD file such as the TERMINATOR movie such that the user upon selection of the icon can have the host computer system play the TERMINATOR DVD movie back to the user. The display 206 may also display icons associated with non-external drives that are internal to the system such as a local DVD icon 476 designated as F:/ local DVD with the movie RIDING GIANTS that can also be selected by the user for viewing.

With this configuration, the external device 210,310 may store a wide variety of application programs, games, music files, movie files, and other multimedia that is easily available for selection and playback by the user with their host computer system. Thus, the external device provides a great way to store media in a very simple and convenient fashion for plugging into any type of host computer system such as a home computer, a laptop computer, a personal digital assistant, etc. Thus, a user with the external device can conveniently carry their favorite games, software, music, and movies with them and can plug it in to any convenient host computer system device. In one embodiment, the external device is portable, is USB powered (i.e. not requiring an external power source), and provides a CD and DVD device emulator. Moreover, because the external device itself stores the media for the user, there is no need to carry around a bunch of different disks. Alternatively, in some embodiments the external device may be self-powered using batteries or may require an external power source.

Further, the external device 210, 310 allows the user to transfer files back and forth from any given host computer to the external memory device and vice-versa. For example, a user can transfer their favorite software, CD music, games, and DVD movies back and forth from a variety of different host systems.

Another advantage is that when the external device 210, 310 is plugged into a host computer system 202, it provides for the booting and running of applications that bypass the normal WINDOWS boot procedures on many personal computer systems and/or MACINTOSH systems. Thus, applications such as system repair, can be immediately installed bypassing WINDOWS. Further, because the external device is powered only by the USB interface and requires much less power than a traditional DVD or CD player, battery life associated with laptops and personal portable computing devices can be significantly increased. This is because a user plays all of his or her favorite CD and DVD media, such as music and movies, with much less power consumption than that required by traditional DVD drives and CD drives.

Figure 5:
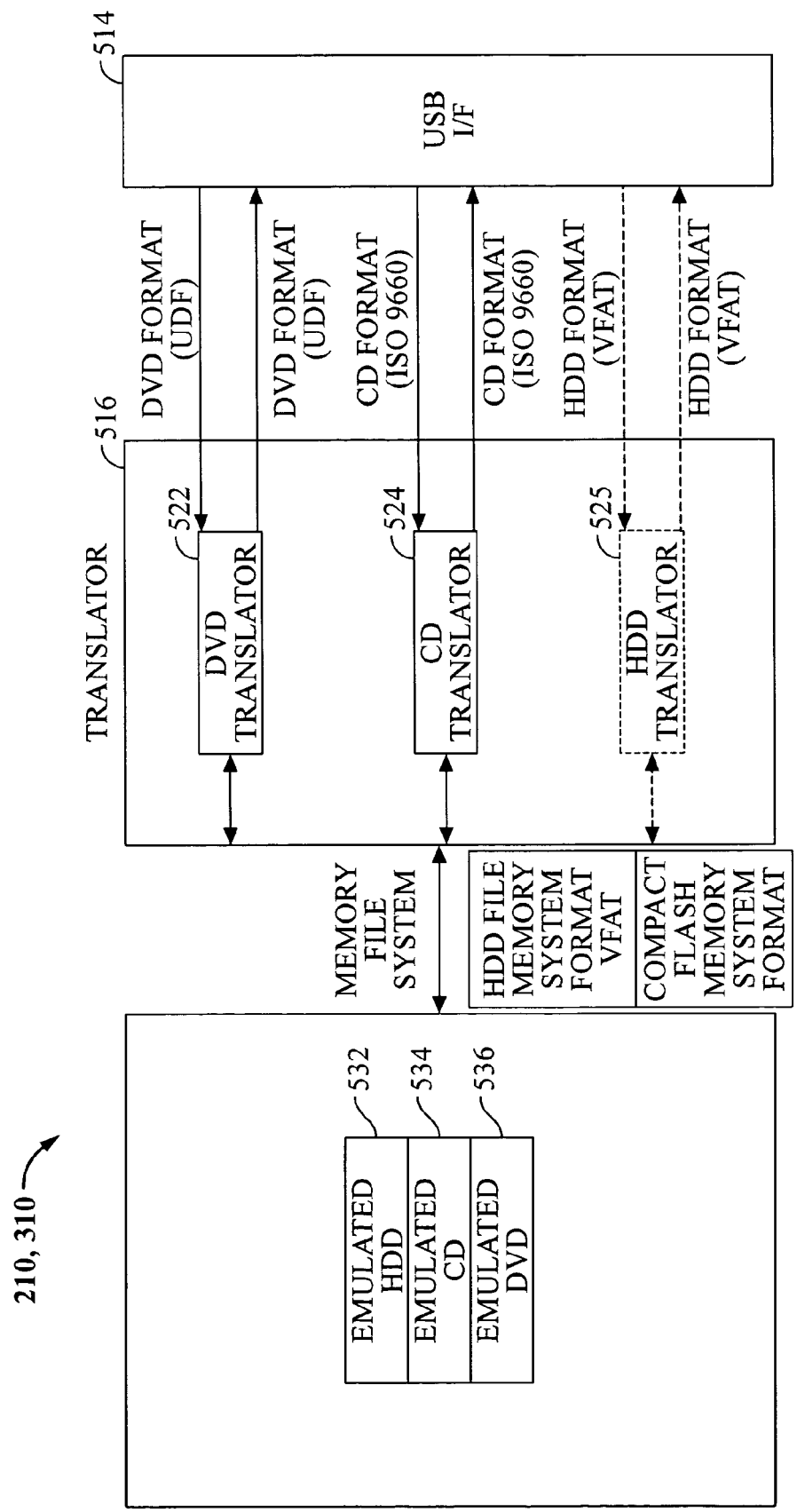
FIG. 5 is a block diagram illustrating a more detailed description of a translator for use in an external memory device, according to one embodiment of the invention.

Turning now to FIG. 5, FIG. 5 is a block diagram illustrating a more detailed description of a translator 516 for use in the external memory device. As shown in FIG. 5, an external memory device such as compact flash memory 210 or an external disk drive device 310 (hereinafter referred to as external device), may include a plurality of HDD applications 532 stored as an emulated HDD 532, a plurality of CD files (e.g. MP3s) stored as an emulated CD drive 534, and a plurality of DVD files (e.g. stored as MPEGs) stored as an emulated DVD drive 536, as previously discussed in detail.

Translator 516 may be utilized to translate memory formats back and forth through USB interface 514 to and from a host computer system, respectively. Particularly, translator 516 may include a DVD drive translator 522, a CD drive translator 524, and an HDD translator 525. However, it should be appreciated that when the external memory device is itself an HDD, the HDD translator 525 may not be utilized because data traffic to and from the host computer system to the external HDD is already in HDD format such that translation is not required. Therefore, HDD translator 525 is shown in dashed lines. It should also be noted that the USB interface 514 is utilized in this embodiment because the USB interface allows for the presentation of multiple devices to a host computer system through the same connector.

In the external hard disk drive device embodiment 310, the DVD translator 522 of translator 516 will receive data in DVD format (e.g. in Universal Disk Format (UDF)) from the USB interface 514 from the host computer system to be written to memory and DVD translator 522 will translate the UDF data into an HDD file memory format (e.g. Virtual File Allocation Table (VFAT), FAT16, FAT32, NTFS, HFS, HPFS, etc.) for storage as an emulated DVD 536 drive in the external hard disk drive device (e.g. on the disk media). Conversely, when the host system requests particular DVD data, the DVD translator 522 will translate the emulated DVD data stored in the external hard disk drive back into a DVD UDF format for use by the host computer system and this data will be transmitted back through USB interface 514 to the host system.

Similarly, in the external hard disk drive device embodiment 310, the CD translator 524 of translator 516 will receive data in CD format (e.g. in ISO 9660 format) from the USB bus interface 514 from the host computer system to be written to memory and CD translator 524 will translate the CD ISO 9660 format data into an HDD file memory format for storage as an emulated CD drive 534 for storage in the external hard disk drive device (e.g. on the disk media). Conversely, when the host system requests particular CD data, the CD translator 524 will translate the emulated CD data stored in the external hard disk drive as HDD file memory format back into a CD ISO 9660 format for use by the host computer system and this data will be transmitted back through USB interface 514 to the host system.

In the external hard disk drive device embodiment 310, where the external memory device is itself an HDD, the HDD translator 525 may not utilized because traffic to and from the host computer system is already in a HDD VFAT format and may be written to and read from the disk of the external HDD in the HDD format itself such that translation is not required.

In the compact flash memory embodiment 210, translator 516 may be utilized to translate memory formats back and forth through USB interface 514 to and from the host computer system, respectively. Particularly, in the compact flash memory embodiment 210, translator 516 utilizes all three of the translators: DVD translator 522, CD translator 524, and HDD translator 525.

In the compact flash memory embodiment 210, the DVD translator 522 of translator 516 will receive data in DVD format (e.g. in Universal Disk Format (UDF)) from the USB interface 514 from a host computer system to be written to memory and DVD translator 522 will translate the UDF data into a compact flash memory format for storage as an emulated DVD drive 536 for storage in the compact flash memory device. Conversely, when the host system requests particular DVD data, the DVD translator 522 will translate the emulated DVD drive 536 data stored in the compact flash memory device in compact flash memory format back into a DVD UDF format for use by the host computer system and this data will be transmitted back through USB interface 514 to the host system. The compact flash memory format may be any suitable format including, but not limited to: FTL, FFS, VFAT, FAT16, FAT32, NTFS, HFS, HPFS, etc.

Similarly, in the compact flash memory embodiment 210, the CD translator 524 of translator 516 will receive data in CD format (e.g. in ISO 9660 format) from the USB interface 514 from a host computer system to be written to memory and CD translator 524 will translate the CD ISO 9660 format data into a compact flash memory format file memory format for storage as an emulated CD drive 534 for storage in the compact flash memory device. Conversely, when the host system requests particular CD data, the CD translator 524 will translate the emulated CD drive 534 data stored in the compact flash memory device in compact flash memory format back into a CD ISO 9660 format for use by the host computer system and this data will be transmitted back through USB interface 514 to the host system.

Similarly, in the compact flash memory embodiment 210, the HDD translator 525 of translator 516 will receive data in HDD format from the USB interface 514 from a host computer system to be written to memory and HDD translator 525 will translate the HDD format data into a compact flash memory format for storage as an emulated HDD 532 in the compact flash memory device. Conversely, when the host system requests particular HDD data, the HDD translator 525 will translate the emulated HDD 532 data stored in the compact flash memory device in compact flash memory format back into HDD format for use by the host computer system and this data will be transmitted back through USB interface 514 to the host system.

Figure 6:
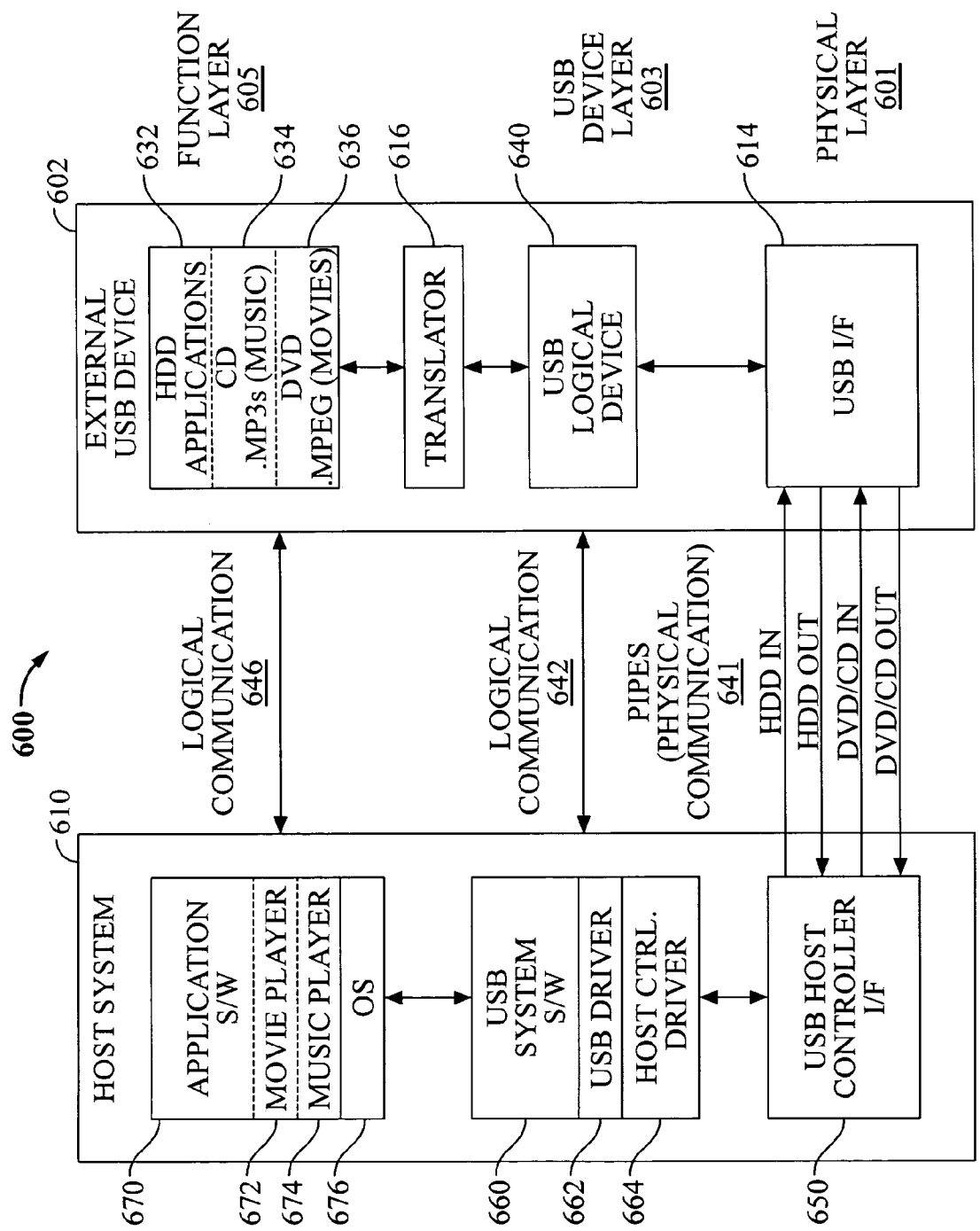
FIG. 6 is a block diagram illustrating the use of a USB environment in order to implement data transfer between an external USB memory device and a host computer system, according to one embodiment of the invention.

Turning now to FIG. 6, FIG. 6 illustrates a block diagram 600 to illustrate the use of the USB environment in order to implement data transfer between an external USB memory device 602 and the host computer system 610. As previously discussed, the USB protocol allows an external device to present multiple devices through the same USB connector to a host system. USB protocol is well known in the art.

As is known in the art, the USB physical bus interface layer 601 provides for the low-level transfer of data over USB cables (e.g. physical communication 641). The layer consists of physical connections, an electrical signaling environment, and packet transfer mechanisms. The physical layer 601 represents the actual transfer of data across the USB cable between the host system 610 and the external USB memory device 602.

Further, the USB device layer 603 represents the portion of USB protocol that comprehends the actual communication mechanism in the nature of transfers required by a USB functional device (e.g. logical communication 642). The USB device layer 603 consists of USB system software 660 on the host system side 610 and a logical view of the USB logical device 640 on the external USB memory device side 602. USB system software 660 views a logical device as a collection of endpoints that comprise a given functional interface. The USB system software 660 provides the services needed to interface client application software 670 with its USB function. The USB system software 660 includes USB transfer mechanisms and allocates bus bandwidth for the external USB memory device 602. The USB system software 660 typically includes a USB driver 662 that provides interface and services for client software drivers, allocates bus bandwidth, and manages configuration process. USB system software 660 also typically includes a USB host controller driver 664 that controls the operations of the host controller, schedules transactions, and monitors completion status of transactions.

Further, the functional layer 605 represents the relationship between client software and the external USB memory device 602 functional interface (e.g. logical communication 646).

USB clients typically view their USB devices as consisting of a given interface that they manipulate.

Particularly, looking at the external USB memory device 602, the functional layer 605 includes HDD applications for use by host application software 670 and OS 676, CD files (e.g. music files such as MP3s) for use by a music player 674 and DVD files 636 (e.g. movies stored as MPEG files) for use by a movie player 672 of the host system 610. As previously discussed, these HDD files, CD files, and DVD files may be stored in an emulated HDD, and emulated CD ROM, and an emulated DVD.

More particularly, embodiments of the invention, taking advantage of the USB physical interface 641, in the first mode of operation, the external USB device 602 communicates with the host computer system through first and second pipes (e.g. HDD in and HDD out) between USB IF 614 and USB host controller IF 650, respectively, in a hard disk drive protocol, and in the second mode of operation, the external USB device 602 communicates with the host computer system 610 through the third and fourth USB input and output pipes (i.e. DVD/CD in and DVD/CD out), respectively, between USB bus interface 614 and USB host controller IF 650, respectively, in an optical disk protocol.

Thus, as shown in FIG. 6, the external USB device 602 in the USB environment includes HDD applications potentially stored as an emulated HDD, CD files stored as an emulated CD drive, DVD files stored as an emulated DVD drive and all of these files may undergo translation by translator 616 as previously discussed, and via logical communication 646 and 642 and physical communication 641, this data may be translated and transmitted through the physical layer 601 between USB interface 614 and USB host controller interface 650 via first and second pipes for HDD information and third and fourth pipes for optical information (e.g. DVD/CD), such that this data is available to and from the host computer system 610 for use with host application software 670, movie players 672, music players 671, operating systems 674, etc. In this way, utilizing a USB interface, the external USB interface device 602 may be fully utilized with the host computer system 610.

It should be appreciated that this is just one example of how an external memory device previously discussed, can be utilized in a USB protocol environment.

It should be appreciated that numerous alternatives for other types of external memory and external disk drives with similar or other media format characteristics can be employed by those skilled in the art to use the invention for an external device that may be powered solely through the interface of a host system with equal advantage.

I claim:

1. A memory device attachable to a host computer system, the memory device comprising:
   an interface to couple the memory device to the host computer system; and
   a controller for controlling operations in the memory device by enabling:
      a first mode of operation in which the memory device communicates with the host computer system through the interface by emulating a disk device;
      a second mode of operation in which the memory device communicates with the host computer system through the interface by emulating an optical device, wherein upon connection of the memory device to the host computer system, the controller communicates the first and second modes of operation to the host computer system such that the host computer system upon a display device displays icons associated with the disk device and the optical device for selection by a user; and
   a translator operable with the controller, the translator to translate optical device data and disk device data received from the host computer system into a memory format for storage in a memory and to translate data requested by the host computer system from the memory into one of an optical device format or a disk device format.

2. The memory device of claim 1, wherein the memory device is fully powered through the interface by the host computer system.

3. The memory device of claim 1, wherein the optical device to be emulated is one of a compact disk (CD) drive and a digital video disk (DVD) drive and the disk device to be emulated is a hard disk drive.

4. The memory device of claim 1, wherein the interface is a Universal Serial Bus (USB) interface and the memory device is fully powered through the USB interface by the host computer system.

5. The memory device of claim 4, wherein, in the first mode of operation, the memory device communicates with the host computer system through first and second USB input and output pipes, respectively, in a disk device protocol, and in the second mode of operation, the memory device communicates with the host computer system through third and fourth USB input and output pipes, respectively, in an optical device protocol.

6. The memory device of claim 5, wherein the USB interface uses a single cable.

7. The memory device of claim 6, wherein the optical device to be emulated is one of a compact disk (CD) drive and a digital video disk (DVD) drive.

8. The memory device of claim 1, wherein the memory device is a flash memory device.

9. The memory device of claim 1, wherein the memory device is a random access memory (RAM) device and includes RAM memory.

10. The memory device of claim 9, wherein the RAM memory of the random access memory (RAM) device is one of a static RAM (SRAM) and a pseudo-static RAM.

11. The memory device of claim 9, wherein the RAM memory of the random access memory (RAM) device is one of a dynamic RAM (DRAM) and a magneto-resistive RAM (MRAM).

12. The memory device of claim 1, wherein the interface is compatible with a IEEE 1394 standard and the memory device is fully powered through the interface by the host computer system.

13. An external disk drive attachable to a host computer system, the external disk drive comprising:
   an interface to couple the external disk drive to the host computer system; and
   a microprocessor for controlling operations in the external disk drive, the microprocessor under the control of a program to enable:
      a first mode of operation in which the external disk drive communicates with the host computer system through the interface by emulating a disk device;
      a second mode of operation in which the external disk drive communicates with the host computer system through the interface by emulating an optical device, wherein upon connection of the external disk drive to the host computer system, the microprocessor communicates the first and second modes of operation to the host computer system such that the host computer system upon a display device displays icons associated with the disk device and the optical device for selection by a user; and a translator operable with the microprocessor, the translator to translate optical device data received from the host computer system into a disk device format for storage onto a disk and to translate data received from the disk in a disk device format into an optical device format for transmission to the host computer system.

14. The external disk drive of claim 13, wherein the external disk drive is fully powered through the interface by the host computer system.

15. The external disk drive of claim 14, wherein the optical device to be emulated is one of a compact disk (CD) drive and a digital video disk (DVD) drive and the disk device to be emulated is a hard disk drive.

16. The external disk drive of claim 13, wherein the interface is a Universal Serial Bus (USB) interface and the external disk drive is fully powered through the interface by the host computer system.

17. The external disk drive of claim 16, wherein, in the first mode of operation, the external disk drive communicates with the host computer system through first and second USB input and output pipes, respectively, in a disk device protocol, and in the second mode of operation, the external disk drive communicates with the host computer system through third and fourth USB input and output pipes, respectively, in an optical device protocol.

18. The external disk drive of claim 17, wherein the USB interface uses a single cable.

19. The external disk drive of claim 13, further comprising a third mode of operation in which the external disk drive communicates with the host computer system as a floppy disk drive to emulate a floppy disk drive.

20. The external disk drive of claim 13, further comprising a third mode of operation in which the external disk drive communicates with the host computer system as a zip disk drive to emulate a zip disk drive.

21. The external disk drive of claim 13, further comprising a third mode of operation in which the external disk drive communicates with the host computer system as a magneto-optical disk drive to emulate a magneto-optical disk drive.

22. The external disk drive of claim 13, wherein the interface is compatible with a IEEE 1394 standard and the external disk drive is fully powered through the interface by the host computer system.

23. A method for operating an external memory device, comprising:

controlling operations in the external memory device with a microprocessor;

interfacing with a host computer system through an interface, comprising:

communicating with the host computer system through the interface in a first mode of operation in which the external memory device emulates a disk device;

communicating with the host computer system through the interface in a second mode of operation in which the external memory device emulates an optical device;

upon connection of the external disk drive to the host computer system, communicating the first and second modes of operation to the host computer system such that the host computer system upon a display device displays icons associated with the disk device and the optical device for selection by a user;

translating optical device data received from the host computer system into a disk device format for storage onto a disk; and translating data received from the disk in a disk device format into an optical device format for transmission to the host computer system.

24. The method of claim 23, wherein the external memory device comprises a disk drive.

* * * * *

UNITED STATES PATENT AND TRADEMARK OFFICE
CERTIFICATE OF CORRECTION

PATENT NO. : 7,496,493 B1 Page 1 of 1
APPLICATION NO. : 10/984289
DATED : February 24, 2009
INVENTOR(S) : Curtis E. Stevens It is certified that error appears in the above-identified patent and that said Letters Patent is hereby corrected as shown below:

On the Title Page, Item (54):

Delete "EXTERNAL MEMORY DEVICE TO PROVIDE DISK DEVICE AND OPTICAL FUNCTIONALITY" and replace therefore with -- EXTERNAL MEMORY DEVICE TO PROVIDE DISK DEVICE AND OPTICAL DEVICE FUNCTIONALITY --.

Signed and Sealed this

Sixteenth Day of March, 2010

David J. Kappos
*Director of the United States Patent and Trademark Office*

UNITED STATES PATENT AND TRADEMARK OFFICE
CERTIFICATE OF CORRECTION

PATENT NO. : 7,496,493 B1 Page 1 of 1
APPLICATION NO. : 10/984289
DATED : February 24, 2009
INVENTOR(S) : Curtis E. Stevens It is certified that error appears in the above-identified patent and that said Letters Patent is hereby corrected as shown below:

On the Title Page, Item (54) and at Column 1, lines 1-3, title:

Delete "EXTERNAL MEMORY DEVICE TO PROVIDE DISK DEVICE AND OPTICAL FUNCTIONALITY" and replace therefore with -- EXTERNAL MEMORY DEVICE TO PROVIDE DISK DEVICE AND OPTICAL DEVICE FUNCTIONALITY --.

This certificate supersedes the Certificate of Correction issued March 16, 2010.

Signed and Sealed this

Sixth Day of April, 2010

David J. Kappos
*Director of the United States Patent and Trademark Office*